United States Patent [19]
Richmond et al.

[11] 3,799,304
[45] Mar. 26, 1974

[54] HYDRAULIC CONTROL SYSTEM FOR POWER TRANSMISSION HAVING A MODULATED FRICTION CLUTCH

[75] Inventors: Wendell E. Richmond, Rockford; Robert W. Meyer, Pecatonica, both of Ill.

[73] Assignee: Twin Disc Incorporated, Racine, Wis.

[22] Filed: Oct. 30, 1972

[21] Appl. No.: 302,239

[52] U.S. Cl. .................... 192/3.57, 74/732, 74/733
[51] Int. Cl. ...................... F16d 67/00, F16h 47/00
[58] Field of Search ............ 192/3.57; 74/730, 733, 74/732

[56] References Cited
UNITED STATES PATENTS

| | | | |
|---|---|---|---|
| 3,680,398 | 8/1972 | Schneider et al. | 192/3.57 X |
| 3,621,955 | 11/1971 | Black et al. | 192/3.57 |
| 3,352,392 | 11/1967 | Black et al. | 192/3.57 |
| 3,348,644 | 10/1967 | Hilpert | 192/3.57 X |
| 3,006,219 | 10/1961 | Snoy | 74/730 |
| 3,241,399 | 3/1966 | Fisher et al. | 74/732 X |

Primary Examiner—Samuel Scott
Assistant Examiner—Lance W. Chandler
Attorney, Agent, or Firm—James E. Nilles

[57] ABSTRACT

A hydraulic control system for a power transmission of the type having a modulated friction clutch and torque converter. The transmission also includes a multi-ratio gear selection unit which is hydraulically operated and the entire transmission is interposed between a source of power such as an internal combustion engine and the load. The control mechanism also includes a modulating valve for the friction clutch and a separate control valve for the modulating valve.

1 Claim, 6 Drawing Figures

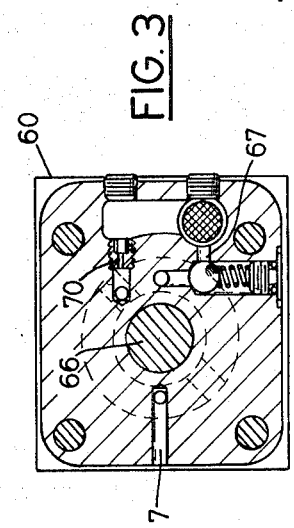
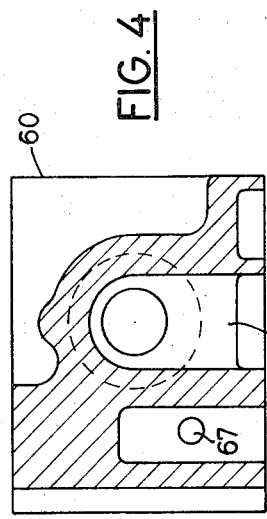
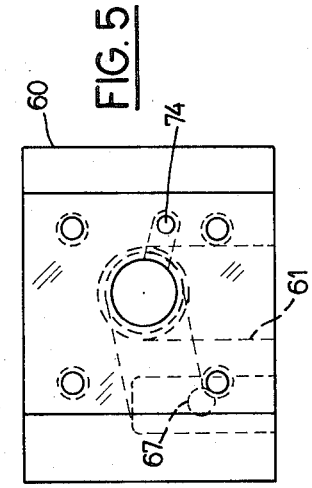
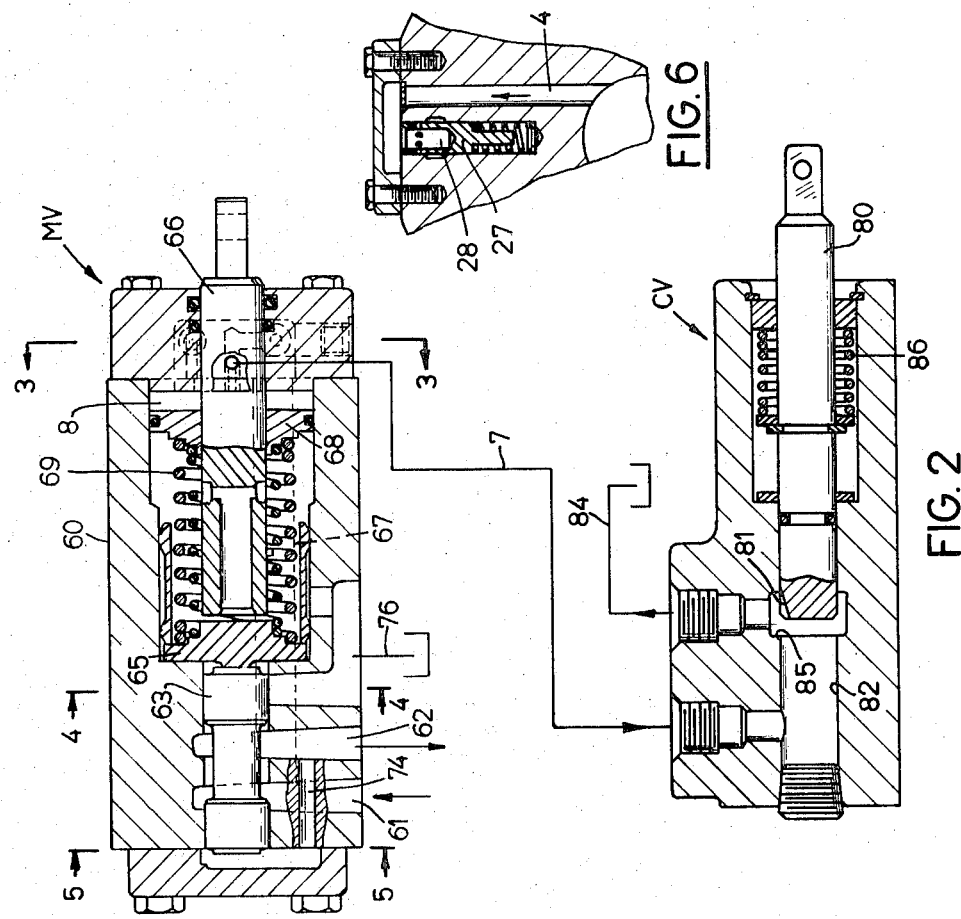

HYDRAULIC CONTROL SYSTEM FOR POWER TRANSMISSION HAVING A MODULATED FRICTION CLUTCH

BACKGROUND OF THE INVENTION

The invention pertains to control systems for power transmissions for transmitting power from a prime mover to a load through a reversible drive transmission. In particular, the control system regulates the energization of various actuators which selectively complete and interrupt the drive train to establish forward or reverse drives at various speeds.

The invention finds particular utility in control power transmissions for earth working equipment, such as crawler type tractors where the operator has various functions to perform with his hands and feet. It is therefore desirable for the operator to control several of these functions with either his hands or feet.

The present invention is in the nature of an improvement over the device shown in the U.S. Pat. No. 3,438,469, which issued Apr. 15, 1969 to Hilpert and entitled "Control for a MOdulated Clutch and Reversible Transmission with Shift-Restricting Inhibitors" and which patent has been assigned to an assignee common with the present application. While the control system of that device did work well for the purposes for which it was intended, it did utilize two regulating valves in series that could interact with one another and produce an unstable regulated pressure.

SUMMARY OF THE PRESENT INVENTION

The present invention provides a control system for a power transmission of the type that includes a modulated friction clutch for driving a torque converter and which also includes a multi-ratio, hydraulically operated gear shift mechanism. The control system includes a modulating valve for hydraulically controlling the friction clutch, a selector valve for controlling the flow of pressure fluid to any one of a number of actuators for the gear change mechanism, and a control valve for regulating, that is for dumping the fluid pressure from the regulating chamber of the modulating valve. With this construction, the operator of the vehicle can exhaust the modulating valve and therefore, the operator also has foot control for regulating the vehicle speed. The present invention provides a simplified control system for a power transmission of the above character and eliminates the use of two regulating valves in series which would otherwise produce unstable regulating pressure.

These and other objects and advantages of the present invention will appear hereinafter as this disclosure progresses, reference being had to the accompanying drawings.

BRIEF DESCRIPTION OF THE DRAWINGS

FIG. 2 is an enlarged view of the modulating valve and the control valve as shown in FIG. 1;

FIG. 3 is a sectional view taken along line 3—3 in FIG. 2;

FIG. 4 is a sectional view taken along line 4—4 in FIG. 2;

FIG. 5 is a sectional view taken along the line 5—5 in FIG. 2; and

FIG. 6 is a fragmentary sectional view taken along the line 6—6 in FIG. 1.

DESCRIPTION OF A PREFERRED EMBODIMENT

Figure 1:
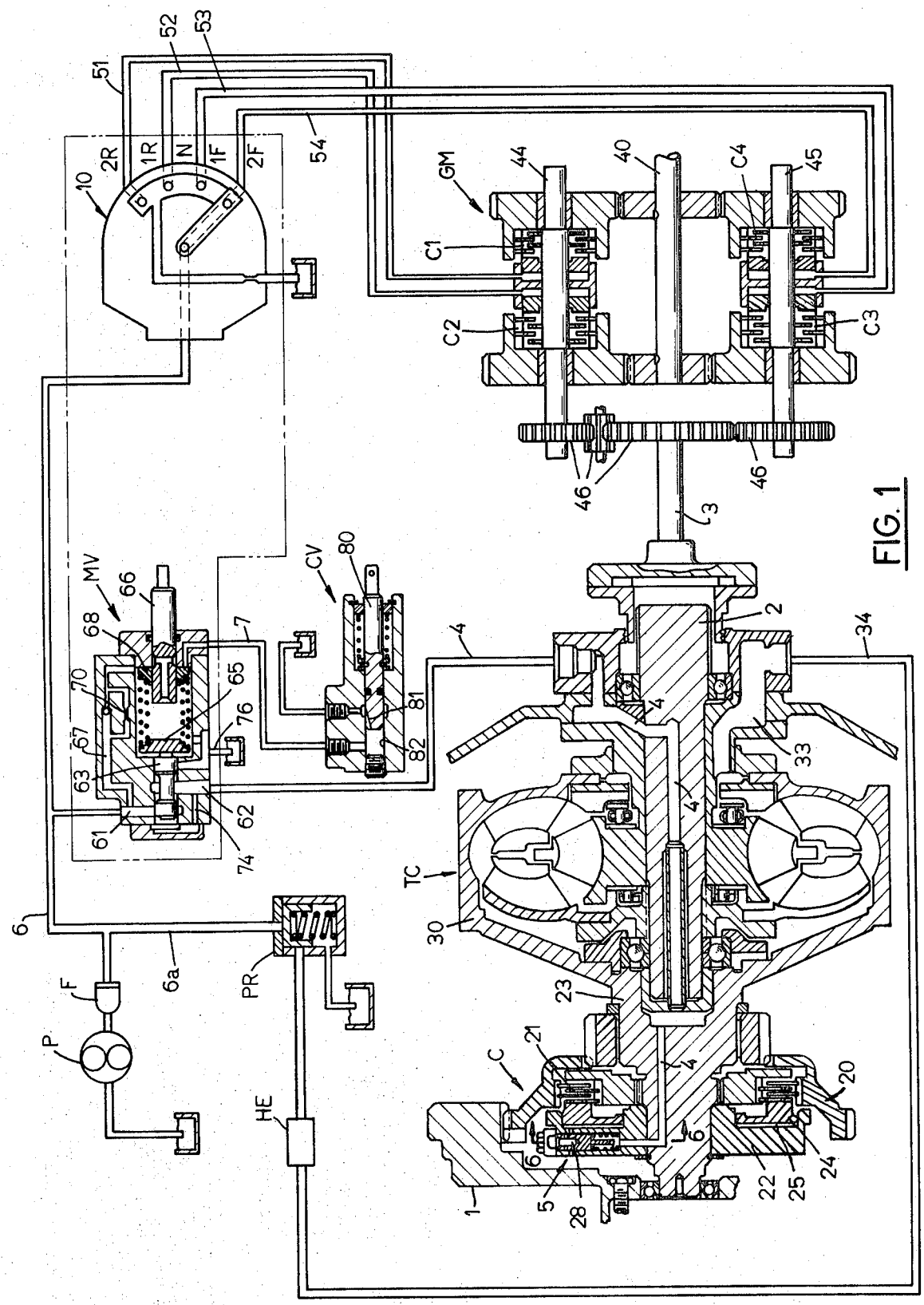
FIG. 1 is a schematic diagram of the power transmission embodying the present invention.

The power transmission in general includes a modulated, friction type clutch C which is driven from a part of the engine 1 and which clutch delivers power to the torque converter TC. The torque converter in turn delivers power through its output shaft 2 to the input shaft 3 of a multi-speed, hydraulically operated gear mechanism GM. Pressure fluid from a fluid pump P is delivered via a filter F, and conduit 6 to a modulating valve MV. A pressure regulator PR is located at the pump outlet, in conduit 6a to control the main pressure in the system. A heat exchanger HE is located downstream from the pump in conduit 34.

The valve MV acts to regulate the flow of pressure fluid from the fluid pump P via a conduit and passage means 4 to a centrifugal valve 5 of the clutch C. The general arrangement also includes a control valve CV which is connected by a conduit 7 to the regulating chamber 8 (FIG. 2) of the modulating valve MV. The general organization also includes a selector valve 10 which controls the flow of pressure fluid from the pump P to any one of a number of hydraulically actuated clutches C1, C2, C3, or C4 of the gear mechanism GM.

More specifically, the modulating clutch C is of the type having an input member 20 that is driven from the engine member 1 and power is transmitted through the interleaved friction plates 21 to the output member 22 of the clutch that in turn is rigidly fixed to the input member 23 of the torque converter. The clutch includes a piston 24 that is actuated by a fluid pressure in actuating chamber 25 so as to cause clamp up of the interleaved clutch plates 21. The amount of pressure applied by the piston is determined by the pressure fluid admitted to the chamber 25 by the centrifugally operated valve 5. The valve 5 is of the type shown in the Hilpert U.S. Pat. No. 3,352,395 issued Nov. 14, 1967 and it is believed sufficient to say for purposes of this disclosure that the valve is located on the output side of the clutch and acts to maintain a constant output speed of the clutch. Furthermore, as previously indicated, pressure fluid is supplied to the valve 5 via the passage means 4 and is directed to the radial outer end of the shiftable valve element 27 of the valve 5, thus regulating the flow of pressure fluid via the center chamber 28 of the element 27 and to the actuating chamber 25 of the piston. Thus, the modulated clutch is designed to operate continuously with any degree of slippage as determined by the pressure with which its interleaved friction plates are clamped together.

Torque converter TC may be of any one of several number types, for example, as shown in the U.S. Pat. No. 3,680,398, issued Aug. 1, 1972 to Schneider, and it is believed sufficient to say that power delivered by the clutch through the rotating housing 30 of the torque converter is then delivered through the toroidal fluid path of the torque coverter to the turbine and then to the output shaft 2 of the converter. It is also believed sufficient to say that fluid pressure is delivered to the toroidal path of the torque converter via the passage 33 which receives fluid pressure from the pump P via conduit 34.

The power that is delivered by the torque converter to the gear mechanism from the torque converter via the shaft 3 ultimately is delivered out of the output shaft 40 of the gear mechanism. The shaft 40 can be driven at various speeds in either forward or reverse directions by means of the selection of any of the clutches C1, C2, C3, or C4 in the known manner. It is believed sufficient to say that shaft 44 of the mechanism is the reverse shaft while shaft 45 is the forward shaft and each of these shafts is continuously rotated by the gears 46. The particular clutch selected for engagement is determined by the selector valve 10 which is connected in the known manner by conduits 51, 52, 53 and 54 to their respective hydraulically actuated clutches C1, C2, C3, and C4. By way of example, such a gear mechanism is shown in the U.S. Pat. No. 3,626,861, issued Dec. 14, 1971 to Black and Luzaich and entitled "Method of Operation of a Plurality of Power Transmissions."

The selector valve 10 admits pressure fluid from the engine pump P to any one of the four clutches mentioned, or vents pressure fluid from the clutches not engaged back to the sump. This selector valve is also shown and described in the said U.S. Pat. No. 3,438,469 and further reference to it is not deemed to be either necessary or desirable.

In order to control the amount of pressure fluid which is directed from the pump P to the valve 5 of the modulated clutch, a modulating valve MV is provided. This valve includes a body 60 having an inlet port 61 and an outlet port 62. An axially shiftable spool 63 acts to control the amount of fluid flowing from the inlet port 61 to the outlet port 62 and consequently, to the valve 5. The position of the spool 63 is determined by the action of a piston 65 abutting thereagainst which in turn is influenced by the operating stem 66 and the amount of pressure in the regulating chamber 8 acting on piston 68 that in turn urges spring 69 against the piston 65. One type of such modulating valve is shown in the U.S. Pat. No. 3,621,955, issued Nov. 23, 1971 to Black and Meyer and entitled "Torque Limiting Clutch for Torque Converter controlled by Speed and transmission Selector." It is believed sufficient to say that when the operator stem 66 is urged to the left as shown in FIG. 2, the spool 63 is shifted to the left thereby admitting fluid to flow in various degrees from inlet 61 to outlet 62.

Valve MV is manually controlled, for example either by the foot or hand of the operator and is thus manually set and regulates the flow of pressure in the system from the pump P to the centrifugal valve 5 of the clutch. The valve MV can be set so that the pressure of the modulating clutch is set from zero to the maximum amount of available pressure. Valve MV includes a by-pass passage 67 which leads from inlet passage 61 and to the regulating chamber 8, and this by-pass pressure acts as a power assist for the manually controlled valve stem 66.

The valve MV operates to permit pressure fluid into chamber 8 behind the spring force piston 68 via orifice 70 in passage 67.

Pressure in chamber 8 forces piston 68 to the left, compressing spring 69 which in turn forces piston 65 against the end of the regulating spool 63. Spool 63 meters the pressure to the clutch control valve 5 via conduit 4. Metered clutch control pressure also feds the left end of spool 63 via conduit 74, enabling the spool to be a pressure regulator for fluid in conduit 4 and at the same time meters off the drain to sump via conduit 76. Thus, the operator by hand or foot, forces stem 66 inward to the left to increase clutch control pressure and outward to the right to reduce control pressure in conduit 4.

The control valve CV is connected via conduit 7 to the regulating chamber 8 of valve MV. The control valve CV has a stem 80 which includes an inclined recess 81 at its inner end. The diameter of the inner end of stem 80 is such that it slidingly seals in the bore 82 of the valve CV and in the position shown in FIG. 2, fluid is free to flow from conduit 7 through bore 82 and out conduit 84 to the sump. Depending on the position of the stem 80 and more particularly depending on the position of the inclined recess 81, in respect to shoulder 85 in the bore, fluid can be metered through the recess 81 which with shoulder 85 acts as a variable orifice, and thus the amount of fluid dumped from chamber 68 to sump can be varied depending on the position of stem 80. Stem 80 is urged to a closed position by a spring 86. Stem 80 in turn can be operated by the foot of the operator while the modulating valve is operated by the operator's hands.

The control valve CV provides a secondary control for determining the amount of pressure fluid admitted to the clutch and consequently determining the speed of the vehicle. Thus, the foot operated valve CV has an orifice forming spool that acts as a variable orifice for draining the regulating chamber of the valve, thereby providing operator foot control for regulating vehicle speed. Thus, if the operator is using his hands to perform other functions, he can conveniently regulate speed with his foot, or vice versa.

We claim:

1. In a control system for a power transmission having a hydraulically operated, modulated friction type clutch connnected in driving relationship to a torque converter, said modulated clutch including hydraulically shiftable piston means for causing clutch clamp-up and a centrifugal hydraulic valve for regulating the amount of pressure fluid admitted to said piston means, and a multi-ratio, hydraulically operated gear shift mechanism driven by said torque converter, said shift mechanism having a plurality of hydraulically operated clutches, a selector valve for selectively operating any one of said mechanism clutches; a set pressure regulator for admitting a fixed fluid pressure to said selector valve, a source of fluid pressure for said hydraulically operated modulated clutch including a fluid pump, a modulating valve between said source of fluid pressure and said modulated clutch, said source of pressure fluid connected directly to said pressure regulator and to said modulating valve, whereby a fixed fluid pressure is delivered to both said selector valve and to said modulating valve, said modulating valve having an operator shiftable element for controlling flow of fluid pressure to said modulated clutch, said modulating valve also having an acutating means for said shiftable element including a pressure regulating chamber, and an operator foot operated control valve in fluid communication with said regulating chamber and having adjustable orifice means for dumping pressure fluid from said regulating chamber and reducing the power output from torque converter to the gear shift mechanism.

* * * * *